United States Patent [19]

Estes

[11] Patent Number: 4,521,391

[45] Date of Patent: Jun. 4, 1985

[54] METHOD TO IMPROVE YIELDS OF SODIUM HYPOPHOSPHITE

[75] Inventor: William E. Estes, Ossining, N.Y.

[73] Assignee: Stauffer Chemical Company, Westport, Conn.

[21] Appl. No.: 570,477

[22] Filed: Jan. 13, 1984

[51] Int. Cl.³ .................. C01B 15/16; C01B 25/26
[52] U.S. Cl. ............................................ 423/307
[58] Field of Search .......................... 423/307, 316

[56] References Cited

U.S. PATENT DOCUMENTS

| | | | |
|---|---|---|---|
| 2,036,760 | 4/1936 | Knox | 423/309 |
| 2,938,770 | 5/1960 | Pahud | 423/307 |
| 2,976,117 | 3/1961 | Pahud | 423/307 |
| 2,977,192 | 3/1961 | Cummins | 423/307 |
| 3,052,519 | 9/1962 | Bianchi et al. | 423/307 |

FOREIGN PATENT DOCUMENTS 1119237  12/1961  Fed. Rep. of Germany ...... 423/307

*Primary Examiner*—Gregory A. Heller
*Attorney, Agent, or Firm*—Vivienne T. White

[57] ABSTRACT

A process of producing sodium hypophosphite ($NaH_2PO_2$) is disclosed wherein the yield of the product is increased. The process comprising reacting phosphorus, sodium hydroxide, calcium hydroxide and water wherein the $H_2O/P_4$ ratio is increased from about 35 to from about 38 to about 60.

2 Claims, No Drawings

METHOD TO IMPROVE YIELDS OF SODIUM HYPOPHOSPHITE

FIELD OF THE INVENTION

The invention relates to an improved process for manufacturing sodium hypophosphite wherein the yields of the product are significantly increased.

RELATED ART

In a batch process for the manufacture of sodium hypophosphite, sodium hydroxide, water and calcium hydroxide are reacted with liquid phosphorus. In this process hydrated lime, generally 50% caustic, and water are slurried and liquid phosphorus is added to the slurry over a period of hours. The main reactions of the process are as follows:

$$4NaOH + P_4 + 8H_2O \rightarrow 4NaH_2PO_2 \cdot H_2O + 2H_2 \uparrow \quad (1)$$

$$2Ca(OH)_2 + P_4 + 4H_2O \rightarrow 2Ca(H_2PO_2)_2 + 2H_2 \uparrow \quad (2)$$

$$P_2 + 2Ca(OH)_2 + 5H_2O \rightarrow 2CaHPO_3 \cdot 1\tfrac{1}{2}H_2O \downarrow + 2PH_3 \uparrow \quad (3)$$

$$P_4 + 4NaOH + 2H_2O \rightarrow 2Na_2HPO_3 + 2PH_3 \uparrow \quad (4)$$

$$NaH_2PO_2 + NaOH \rightarrow Na_2HPO_3 + H_2 \uparrow \quad (5)$$

During the reaction, the gaseous byproducts, phosphine and hydrogen, are vented to an incinerator. The reaction slurry, consisting of $NaH_2PO_2$, $CaHPO_3 \cdot 1\tfrac{1}{2}H_2O$, and $H_2O$, as well as small quantities of $Ca(H_2PO_2)_2$ and $Na_2HPO_3$, is filtered to remove the insoluble calcium phosphite, and the calcium hypophosphite is converted to the sodium salt via reaction with bicarbonate. The calcium carbonate resulting from the calcium to sodium salt conversion is separated via filtration, and the filtrate is concentrated by evaporation under vacuum. The product is then crystallized, separated from the liquor, and dried.

In the above-described process, the reaction stoichiometry ratio is generally $P_4 = 1$ to $NaOH = 1.99$ to $Ca(OH)_2 = 1.43$ to $H_2O$ of 35.4. Due to the complex series of reactions which occur, the disproportionation of phosphorus occurs and a variety of products are produced. The yield of the sodium hypophosphite product $NaH_2PO_2$ as a result is generally about 50–55 wt. %.

It is an object of the invention to provide a means of increasing the yield of hypophosphite product.

SUMMARY OF THE INVENTION

It was discovered that changing the $H_2O/P_4$ mole ratio from 35.4 to from about 38 to about 60 increased the yield of $NaH_2PO_2$ product. Further increases of said ratio, i.e., $H_2O/P_4$ greater than about 60, result in decreased yields of $NaH_2PO_2$.

DETAILED DESCRIPTION OF THE INVENTION

A method of enhancing the yield and quality of sodium hypophosphite has been found. The method comprises increasing the $H_2O/P_4$ mole ratio in the reaction wherein phosphorus is reacted with sodium hydroxide, lime and water to produce sodium hypophosphite.

Generally it is known in the prior art to add sodium hypophosphite in a stoichiometric reaction where the molar ratios are $P_4 = 1$, $NaOH = 1.99$, $H_2O = 35.4$, $Ca(OH)_2 = 1.43$.

The process as described previously consists of adding the above quantities of sodium hydroxide, calcium hydroxide and phosphorus to a reactor for reaction to produce sodium hypophosphite. The sodium hydroxide and calcium hydroxide are generally added in a slurry to heated water, generally heated to from 80°–100° C. The phosphorus is then added over a period of hours while the temperature is generally maintained at 90°–100° C. The reaction is continued for an additional time, generally 2 hours in the commercial process. The reaction time, however, largely will be determined by the amounts of reactants utilized.

The reaction products comprise sodium hypophosphite, calcium hyposphosphite, calcium phosphite, and the gases—phosphine and hydrogen which are vented and burned. The insoluble calcium phosphite is separated and the hypophosphites are treated with sodium bicarbonate to convert excess $Ca(OH)_2$ to $CaCO_3$ and $Na_2CO_3$ is used to convert the $Ca(H_2PO_2)_2$ sodium hypophosphite and $CaCO_3$. The insoluble $CaCO_3$ is separated and the sodium hypophosphite recovered by known means as for instance by evaporation and crystallization.

In the process of the invention, in contradistinction to the prior art, the reaction mixture is subjected to increased dilution by increasing the $H_2O/P_4$ molar ratio to bring the $H_2O/P_4$ molar ratio at least from about 38 to about 60 and preferably from about 45 to about 55.

It is postulated that with the increased dilution, the following probably occurs: better mixing due to lower solids content is obtained; better heat transfer; more reactivity of the time due to lower "common ion" effects and less decomposition of hypophosphite due to lower concentration of OH ions.

The following Examples are laboratory scale processes wherein reactor slurry is filtered to remove insoluble calcium phosphite and the filtrate, filter cake and other reaction stream is assayed directly to determine content.

The Examples are offered as embodiments of the invention and are not intended to limit the scope of the invention.

EXAMPLE 1

Molten white phosphorus (10.189 moles, 23.4 grams) was added to a hot slurry (90° C.) which consisted of 36.8 grams of 50 wt. % NaOH solution, lime (20 grams), and water (152 grams). The amounts of reactants were chosen such that the overall reaction stoichiometry could be expressed by the ratios $P_4/NaOH/Ca(OH)_2/H_2O = 1/1.99/1.43/50$.

The molten phosphorus was fed to a water jacketed reactor containing the hot slurry over a period of about 24 minutes. Temperature was maintained at from 95°–100° C. The reaction was completed when a burner-scrubber apparatus to which byproduct phosphine-hydrogen gases are conveyed, was extinguished. The reactor slurry was filtered hot (90°–95° C.), allowed to cool to about 60° C. and washed with 300 ml of $H_2O$. The filtrate and washes were combined and assayed for $NaH_2PO_2$. The filter cake was dissolved in 6N HCl and assayed for $HPO^{-2}$ (as $CaHPO_3$). The overall mass balance was completed by assaying the burner-scrubber liquors for $P_2O_5$, which revealed the amount of phosphine generated.

The results obtained were as follows:

$NaH_2PO_2 = 65.3\%$
$CaHPO_3 32\ 16.4\%$
$PH_3 = 20.2\%$

The phosphorus mass balance being 102% and is based on the total amount of $P_4$ recovered divided by the amount of $P_4$ used.

EXAMPLE 2

The process of Example 1 was repeated in a reaction having the stoichiometry of $P_4/NaOH/Ca(OH)_2/H_2O = 1/1.99/1.43/47$ based on 0.379 moles of $P_4$. The yield of $NaH_2PO_2$ was 59% with a phosphorus mass balance of 99.3%.

EXAMPLE 3

The process of Example 1 was repeated using a stoichiometry of $P_4/NaOH/Ca(OH)_2 = 1/1.99/1.43/40$ based on 0.379 moles of $P_4$. Assays revealed average yields of $NaH_2PO_2$ of $60.8 \pm 1\%$ with phosphorus mass balances averaging $103.3 \pm 2\%$.

EXAMPLE 4

The process of Example 1 was repeated in a reaction using the stoichiometry $P_4/NaOH/Ca(OH)_2/H_2O = 1/1.99/1.43/38.5$. The yield of $NaH_2PO_2$ was 60.1% with a phosphorus mass balance of 103.7%.

EXAMPLE 5

The process of Example 1 was repeated in a reaction using the stoichiometry $P_4/NaOH/Ca(OH)_2/H_2O = 1/1.99/1.43/76$. The yield of $NaH_2PO_2$ was 56.6%.

EXAMPLE 6

A reaction was performed using the reactant ratios mentioned in related art, namely $P_4/NaOH/Ca(OH)_2/H_2O = 1/1.99/1.43/35.4$. A comparison between the result of the more dilute reaction stoichiometrics report herein and the known art could be made. The identical apparatus, the identical method of assay, and the procedure of Example 1 was used. The results of the experiment revealed a yield of $NaH_2PO_2$ of 55.6%. This result as well as the result of Example 5 revealed the beneficial effects of reaction stoichiometrics that lie between $H_2O/P_4$ ratios of about 38.0 to about 50. The results are compared in the Table below.

| $H_2O/P_4$ Molar Ratio | $NaH_2PO_2$ Yield |
| --- | --- |
| 35.4 | 55.6% |
| 38.5 | 60.1% |
| 40 | 60.8% |
| 47 | 58.6% |
| 50 | 60.86% |
| 76 | 56.6% |

What is claimed is:

1. A process for increasing the yield of sodium hypophosphite produced by the reaction of phosphorus, sodium hydroxide, water and calcium hydroxide, comprising increasing the $H_2O/P_4$ molar ratio to within the range of about 38 to about 60.

2. The process of claim 1 wherein the $H_2O/P_4$ ratio is from 45–55.

* * * * *

UNITED STATES PATENT AND TRADEMARK OFFICE
CERTIFICATE OF CORRECTION

PATENT NO. : 4,521,391
DATED : June 4, 1985
INVENTOR(S) : William E. Estes

It is certified that error appears in the above—identified patent and that said Letters Patent is hereby corrected as shown below:

Col. 1, third equation, "$P_2$" should be -- $P_4$ --.

Col. 3, line 2, "$CaHPO_3 32$" should be -- $CaHPO_3^=$ --.

Signed and Sealed this

First Day of October 1985

[SEAL]

Attest:

DONALD J. QUIGG

Attesting Officer

Commissioner of Patents and Trademarks—Designate